US012675858B2

(12) United States Patent
Sasaki

(10) Patent No.: US 12,675,858 B2
(45) Date of Patent: Jul. 7, 2026

(54) CERTIFICATE DETERMINATION APPARATUS, CERTIFICATE DETERMINATION METHOD, AND RECORDING MEDIUM

(71) Applicant: NEC Corporation, Tokyo (JP)

(72) Inventor: Kazuyuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 449 days.

(21) Appl. No.: 18/028,007

(22) PCT Filed: Oct. 1, 2020

(86) PCT No.: PCT/JP2020/037414
§ 371 (c)(1),
(2) Date: Mar. 23, 2023

(87) PCT Pub. No.: WO2022/070381
PCT Pub. Date: Apr. 7, 2022

(65) Prior Publication Data
US 2023/0342900 A1 Oct. 26, 2023

(51) Int. Cl.
*G06T 7/00* (2017.01)
*G06T 7/90* (2017.01)
*G06V 10/56* (2022.01)
*G07D 7/20* (2016.01)

(52) U.S. Cl.
CPC .............. *G06T 7/0002* (2013.01); *G06T 7/90* (2017.01); *G06V 10/56* (2022.01); *G06T 2207/30176* (2013.01)

(58) Field of Classification Search
CPC ..................... G06T 7/0002; G06T 7/90; G06T 2207/30176; G06V 10/56; G06V 30/18124; G07D 7/12; G07D 7/164; G07D 7/2016
See application file for complete search history.

(56) References Cited

U.S. PATENT DOCUMENTS

| | | | | |
|---|---|---|---|---|
| 10,726,256 | B2 * | 7/2020 | Wu ......................... | G06V 20/80 |
| 2009/0297041 | A1 * | 12/2009 | Nagamine ................. | G06T 7/73 |
| | | | | 382/209 |
| 2018/0040156 | A1 * | 2/2018 | Kondo ................... | G06F 3/0484 |
| 2019/0205686 | A1 * | 7/2019 | Mayer .................... | H04N 23/64 |
| 2019/0311111 | A1 * | 10/2019 | Lee ............................ | G06T 7/11 |

(Continued)

FOREIGN PATENT DOCUMENTS

| | | | |
|---|---|---|---|
| DE | 2365845 | A1 | 12/1976 |
| JP | 2008-078949 | A | 4/2008 |
| JP | 2019-204293 | A | 11/2019 |

OTHER PUBLICATIONS

Extended European Search Report for EP Application No. 20956309.7, dated on Nov. 3, 2023.

(Continued)

*Primary Examiner* — Amandeep Saini
*Assistant Examiner* — Andrew S Budisalich

(57) ABSTRACT

A certificate determination apparatus (3) includes: a generation unit (311) configured to generate, based on an image (21) in which an identity certificate (5) appears, shadow information related a shadow (51) of the identity certificate appearing in the image; and a determination unit (312) configured to determine, based on the shadow information, whether or not the identity certificate appearing in the image is authentic.

12 Claims, 11 Drawing Sheets

(56) References Cited

U.S. PATENT DOCUMENTS

| | | | | |
|---|---|---|---|---|
| 2020/0394378 | A1* | 12/2020 | Riehl | ...................... G06F 21/32 |
| 2021/0350577 | A1* | 11/2021 | Masuda | ................. H04N 23/56 |
| 2022/0366585 | A1* | 11/2022 | Eliasson | ................. G06T 7/521 |
| 2023/0046591 | A1* | 2/2023 | Neighbour | .............. G06T 7/593 |

OTHER PUBLICATIONS

International Search Report for PCT Application No. PCT/JP2020/037414, mailed on Nov. 2, 2020.

* cited by examiner

SYSa

START

ACQUIRE CERTIFICATE IMAGE — S11

DETECT SHADOW — S12

DETERMINE AUTHENTICITY — S13

END

321b

| CERTIFICATE TYPE | CAMERA ANGLE $\theta c$ | LIGHT SOURCE ANGLE $\theta o$ | DISTANCE (INTERVAL)D | SHADOW LENGTH L | |
|---|---|---|---|---|---|
| DRIVER'S LICENSE | a1 | a2 | a3 | a4 | 322b |
| | b1 | b2 | b3 | b4 | |
| | .... | .... | .... | .... | 322b |
| PASSPORT | a1 | a2 | a3 | a6 | |
| | b1 | b2 | b3 | b6 | |
| | .... | .... | .... | .... | |
| .... | .... | .... | .... | .... | |

| CERTIFICATE TYPE | CAMERA ANGLE $\theta$c | LIGHT SOURCE ANGLE $\theta$p | DISTANCE (INTERVAL)D | SHADOW LENGTH L | SHADOW DIRECTION |
|---|---|---|---|---|---|
| DRIVER'S LICENSE | a1 | a2 | a3 | a4 | a5 |
| | b1 | b2 | b3 | b4 | b5 |
| | . . . . | . . . . | . . . . | . . . . | . . . . |
| PASSPORT | a1 | a2 | a3 | a6 | a7 |
| | b1 | b2 | b3 | b6 | b7 |
| | . . . . | . . . . | . . . . | . . . . | . . . . |
| . . . . | . . . . | . . . . | . . . . | . . . . | . . . . |

322b

CERTIFICATE DETERMINATION APPARATUS, CERTIFICATE DETERMINATION METHOD, AND RECORDING MEDIUM

This application is a National Stage Entry of PCT/JP2020/037414 filed on Oct. 1, 2020, the contents of all of which are incorporated herein by reference, in their entirety.

TECHNICAL FIELD

The present disclosure relates to a technical field of a certificate determination apparatus, a certificate determination method, and a recording medium that are able to determine whether or not an identity certificate appearing in an image is authentic.

BACKGROUND ART

In various fields, a method is adopted in which the identity of a user is proved by using an image acquired by capturing an image of an identity certificate of the user. As an example, when a contract for a mobile phone subscription is made online, a method is adopted in which a subscriber is requested to transmit an image of an identity certificate of the subscriber, and the identity of the subscriber is proved by using the identity certificate appearing in the transmitted image.

SUMMARY OF THE INVENTION

Problem to be Solved by the Invention

To appropriately prove the identity of a user, it is desired to appropriately determine whether or not an identity certificate appearing in an image is authentic. In other words, it is desired to appropriately determine whether an image used to prove the identity of a user is an image generated by capturing an image of a real identity certificate, or an image generated by capturing an image of a fake identity certificate (for example, a document created by copying the identity certificate). In the current situation, however, a human determines, by visually checking an image, whether or not an identity certificate appearing in the image is authentic. Accordingly, a technical problem arises that costs are relatively high for determining whether or not an identity certificate appearing in an image is authentic.

An example object of the present disclosure is to provide a certificate determination apparatus, a certificate determination method, and a recording medium by which the above-described technical problem can be solved. As an example, an example object of the present disclosure is to provide a certificate determination apparatus, a certificate determination method, and a recording medium that are able to determine whether or not an identity certificate appearing in an image is authentic, at relatively low costs.

Means for Solving the Problem

One example aspect of a certificate determination apparatus in the present disclosure includes: a generation unit configured to generate, based on an image in which an identity certificate appears, shadow information related a shadow of the identity certificate appearing in the image; and a determination unit configured to determine, based on the shadow information, whether or not the identity certificate appearing in the image is authentic.

One example aspect of a certificate determination method in the present disclosure includes: One example aspect of a certificate determination apparatus in the present disclosure includes: a generation unit configured to generate, based on an image in which an identity certificate appears, shadow information related a shadow of the identity certificate appearing in the image; and a determination unit configured to determine, based on the shadow information, whether or not the identity certificate appearing in the image is authentic.

One example aspect of a recording medium in the present disclosure is a recording medium storing a computer program that causes a computer to execute a certificate determination method, the certificate determination method includes: a generation step of generating, based on an image in which an identity certificate appears, shadow information related a shadow of the identity certificate appearing in the image; and a determination step of determining, based on the shadow information, whether or not the identity certificate appearing in the image is authentic.

BRIEF DESCRIPTION OF THE DRAWINGS

FIG. 10 is a data structure diagram illustrating an example of a data structure of a shadow length DB.

DESCRIPTION OF EXAMPLE EMBODIMENTS

Hereinafter, example embodiments of a certificate determination apparatus, a certificate determination method, and a recording medium are described with reference to the drawings. In the following, a description is given of certificate determination systems SYS to which the example embodiments of the certificate determination apparatus, the certificate determination method, and the recording medium are applied.

(1) Certificate Determination System SYS According to First Example Embodiment First, a certificate determination system SYS according to a first example embodiment is described. In the following description, the certificate determination system SYS according to the first example embodiment is referred to as "certificate determination system SYSa".

Figure 1:
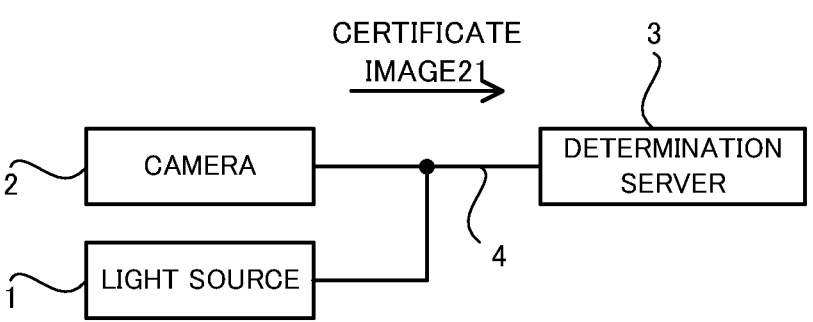
FIG. 1 is a block diagram illustrating an entire configuration of a certificate determination system according to a first example embodiment.

(1-1) Configuration of Certificate Determination System SYSa According to First Example Embodiment First, a configuration of the certificate determination system SYSa according to the first example embodiment is described with reference to FIG. 1. FIG. 1 is a block diagram illustrating the configuration of the certificate determination system SYSa according to the first example embodiment.

As illustrated in FIG. 1, the certificate determination system SYSa includes a light source 1, a camera 2, which is one specific example of "imaging apparatus", and a determination server 3, which is one specific example of "certificate determination apparatus". At least one of the light source 1 and the camera 2 is capable of communicating with the determination server 3 through a communication network (or an arbitrary control line) 4. The communication network 4 may include a wired communication network, or may include a wireless communication network.

Figure 2:
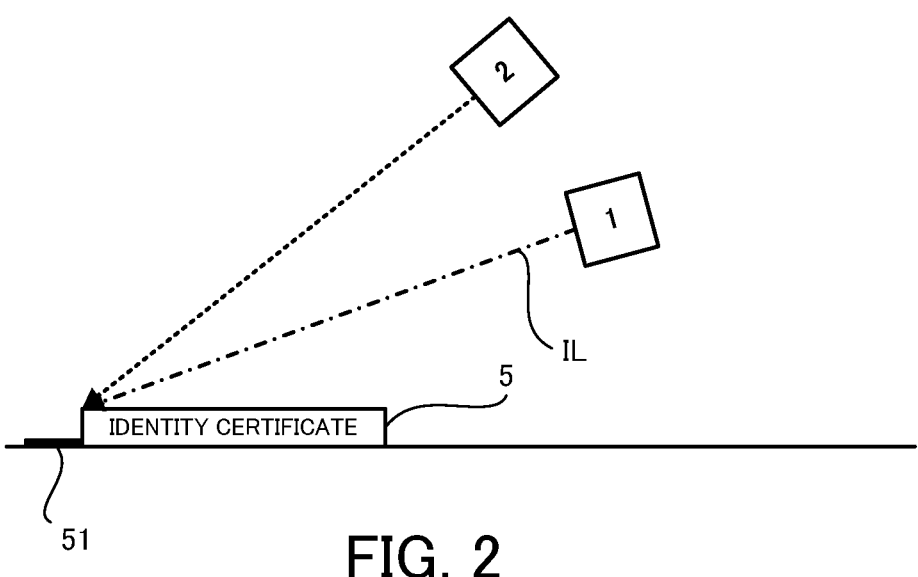
FIG. 2 is a side view illustrating an example of a light source and a camera capturing an image of an identity certificate.

The light source 1 and the camera 2 are used to capture an image of an identity certificate 5 of a user (see FIG. 2). In the first example embodiment, the identity certificate 5 may refer to a physical document that can be used to prove who the user is (in other words, identity or authenticity). Examples of the identity certificate 5 include at least one of a driver's license, a passport (travel document), an insurance certificate, an individual number card, and an ID card.

An example of the light source 1 and the camera 2 capturing an image of the identity certificate 5 is illustrated in FIG. 2. As illustrated in FIG. 2, the light source 1 illuminates the identity certificate 5 with illumination light IL. The camera 2 captures an image of the identity certificate 5 illuminated with the illumination light IL from the light source 1. As a result, the camera 2 generates an image (hereinafter, referred to as "certificate image 21" as appropriate) in which the identity certificate 5 appears. The camera 2 transmits the generated certificate image 21 to the determination server 3 through the communication network 4.

It is preferable that a positional relationship between the light source 1 and the camera 2 be fixed. In other words, it is preferable that the positional relationship between the light source 1 and the camera 2 not be changed. In such a case, it is preferable that the positional relationship between the light source 1 and the camera 2 be information known to the determination server 3. When the positional relationship between the light source 1 and the camera 2 is fixed, a single apparatus may include the light source 1 and the camera 2. In other words, a light source and a camera included in a single apparatus may be used for the light source 1 and the camera 2. As an example, a light source and a camera included in a smartphone or a tablet terminal may be used for the light source 1 and the camera 2.

However, the positional relationship between the light source 1 and the camera 2 does not need to be fixed. In other words, the positional relationship between the light source 1 and the camera 2 may be changed. In such a case, it is also preferable that the positional relationship between the light source 1 and the camera 2 be information known to the determination server 3. In other words, when the positional relationship between the light source 1 and the camera 2 is changed, it is preferable that the determination server 3 be able to identify the changed positional relationship between the light source 1 and the camera 2.

The determination server 3 performs certificate determination operation for determining, based on the certificate image 21, whether or not the identity certificate 5 appearing in the certificate image 21 is authentic. Specifically, based on the certificate image 21, the determination server 3 determines whether the certificate image 21 is an image generated by capturing an image of the real identity certificate 5 (hereinafter, referred to as "identity certificate 5_real" as appropriate), or is an image generated by capturing an image of a fake identity certificate (hereinafter, referred to as "identity certificate 5_fake" as appropriate). Note that the real identity certificate 5_real in the first example embodiment may refer to the identity certificate 5 itself (in other words, the original identity certificate 5). In contrast, the fake identity certificate 5_fake in the first example embodiment may refer to an imitated identity certificate 5 that is not the identity certificate 5 itself. Examples of the identity certificate 5_fake include at least one of a document created by copying the identity certificate 5_real, and a display on which an image of the identity certificate 5_real appears.

Figure 3:
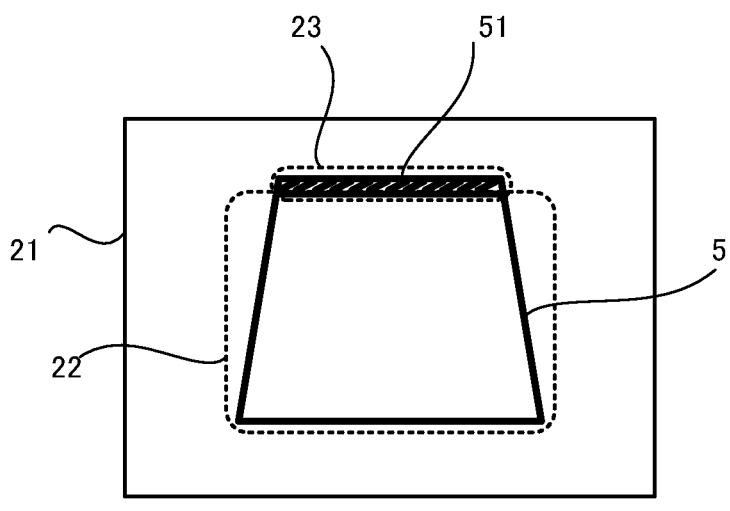
FIG. 3 is a plan view illustrating an example of a certificate image.

In the first example embodiment, in particular, the determination server 3 generates shadow information related to a shadow 51 of the identity certificate 5 appearing the certificate image 21 and, based on the generated shadow information, determines whether or not the identity certificate 5 appearing in the certificate image 21 is authentic. Specifically, when the light source 1 illuminates the identity certificate 5_real with the illumination light IL as illustrated in FIG. 2 described above, a shadow 51 of the identity certificate 5_real is normally created. As a result, in the certificate image 21 in which the identity certificate 5_real appears, the shadow 51 of the identity certificate 5_real also appears, as illustrated in FIG. 3 that is an example of the certificate image 21. In contrast, the thickness of the identity certificate 5_fake, generally, differs from that of the identity certificate 5_real in many cases. For example, when a document created by copying the identity certificate 5_real as described above is used as the identity certificate 5_fake, the thickness of the identity certificate 5_fake is thinner than the thickness of the identity certificate 5_real. As a result, it is highly probable that a state of a shadow 51 of the identity certificate 5_fake created when the light source 1 illuminates the identity certificate 5_fake with the illumination light IL is different from a state of the shadow 51 of the identity certificate 5_fake created when the light source 1 illuminates the identity certificate 5_real with the illumination light IL. Accordingly, the determination server 3 can determine, based on the shadow information, whether or not the identity certificate 5 appearing in the certificate image 21 is authentic.

Figures 4, 5:
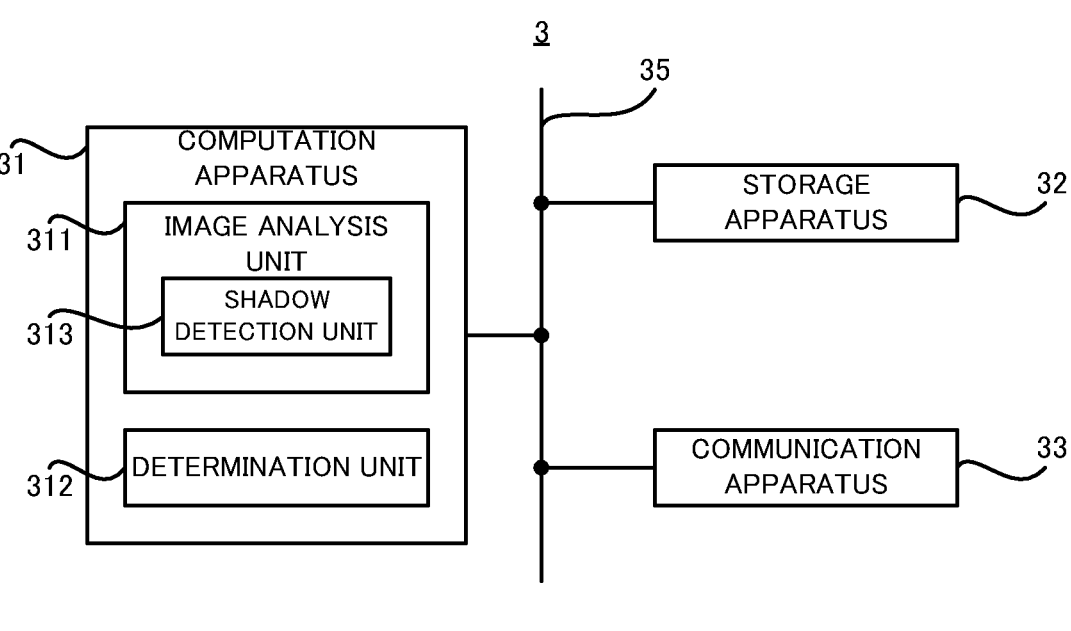
FIG. 4 is a block diagram illustrating a configuration of a determination server in the first example embodiment.
FIG. 5 is a flowchart illustrating a flow of certificate determination operation performed by the determination server in the first example embodiment.

An example of a configuration of the determination server 3 performing such certificate determination operation is illustrated in FIG. 4. As illustrated in FIG. 4, the determination server 3 includes a computation apparatus 31, a storage apparatus 32, and a communication apparatus 33. The computation apparatus 31, the storage apparatus 32, and the communication apparatus 33 are connected through a data bus 34.

The computation apparatus 31 includes, for example, a CPU (Central Processing Unit). The computation apparatus 31 reads a computer program. For example, the computation apparatus 31 may read the computer program stored in the storage apparatus 32. For example, the computation apparatus 31 may read the computer program stored in a computer-readable non-transitory recording medium, by using an undepicted recording medium reading apparatus. The computation apparatus 31 may acquire (that is, may download or may read) the computer program, via the communication apparatus 33, from an undepicted apparatus placed outside of the determination server 3. The computation apparatus 31 executes the read computer program. As a result, in the computation apparatus 31, a logical functional block is implemented for performing an operation (for example, the above-described certificate determination operation) to be performed by the determination server 3. In other words, the computation apparatus 31 can function as a controller for implementing the logical functional block for performing the operation to be performed by the determination server 3.

FIG. 4 illustrates examples of the logical functional block implemented in the computation apparatus 31 to perform the certificate determination operation. As illustrated in FIG. 4, an image analysis unit 311 and a determination unit 312, which is one specific example of "determination unit", are implemented in the computation apparatus 31. Further in the image analysis unit 311, a shadow detection unit 313, which is one specific example of "generation unit", is implemented as a logical functional block. Operations of the image analysis unit 311 and the determination unit 312 will be described in detail later with reference to FIG. 5 and others.

The storage apparatus 32 can store desired data. For example, the storage apparatus 32 may temporarily store the computer program that is executed by the computation apparatus 31. The storage apparatus 32 may temporarily store data that is temporarily used by the computation apparatus 31 when the computation apparatus 31 executes the computer program. The storage apparatus 32 may store data that the determination server 3 retains on a long-term basis. Note that the storage apparatus 32 may include at least one of a RAM (Random Access Memory), a ROM (Read Only Memory), a hard disk apparatus, a magneto-optical disk apparatus, an SSD (Solid State Drive), and a disk array apparatus.

The communication apparatus 33 is capable of communicating with at least one of the light source 1 and the camera 2 through the communication network 4. For example, the communication apparatus 33 may receive a certificate image 21 transmitted from the camera 2 through the communication network 4.

(1-2) Certificate Determination Operation Performed by Determination Server 3

Next, the certificate determination operation performed by the determination server 3 in the first example embodiment is described with reference to FIG. 5. FIG. 5 is a flowchart illustrating a flow of the certificate determination operation performed by the determination server 3 in the first example embodiment.

As illustrated in FIG. 5, the image analysis unit 311 acquires, by using the communication apparatus 33, a certificate image 21 transmitted from the camera 2 through the communication network 4 (step S11).

Thereafter, based on the certificate image 21 acquired in step S11, the shadow detection unit 313 in the image analysis unit 311 detects a shadow 51 of an identity certificate 5 appearing in the certificate image 21 (step S12). Specifically, the shadow detection unit 313, by analyzing the certificate image 21, identifies an image region (hereinafter, referred to as "certificate region 22", see FIG. 3) where the identity certificate 5 appears in the certificate image 21. Thereafter, the shadow detection unit 313, by analyzing the certificate image 21, determines whether or not there exists an image region (hereinafter, referred to as "shadow region 23", see FIG. 3) that extends outward from the certificate region 22 and in which the shadow 51 of the identity certificate 5 appears. When the shadow region 23 exists, the shadow detection unit 313 determines that the shadow 51 of the identity certificate 5 appears in the certificate image 21. When the shadow region 23 does not exist, the shadow detection unit 313 determines that the shadow 51 of the identity certificate 5 does not appear in the certificate image 21. A result of the detection of the shadow 51 by the shadow detection unit 313 in step S12 is outputted, as shadow information, from the shadow detection unit 313 to the determination unit 312. In other words, in the first example embodiment, the shadow information including information related to presence or absence of the shadow 51 in the certificate image 21 is outputted from the shadow detection unit 313 to the determination unit 312.

Figure 6:
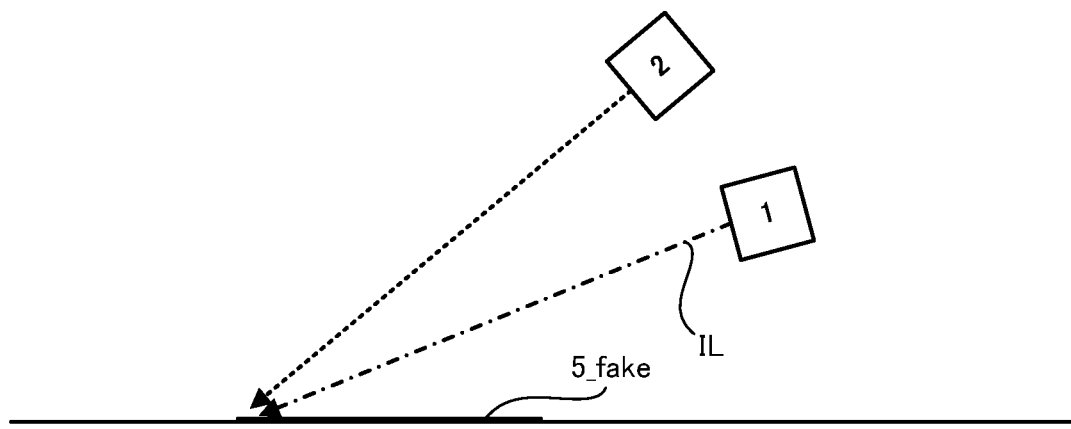
FIG. 6 is a side view illustrating a fake identity certificate illuminated by the light source.
Figure 7:
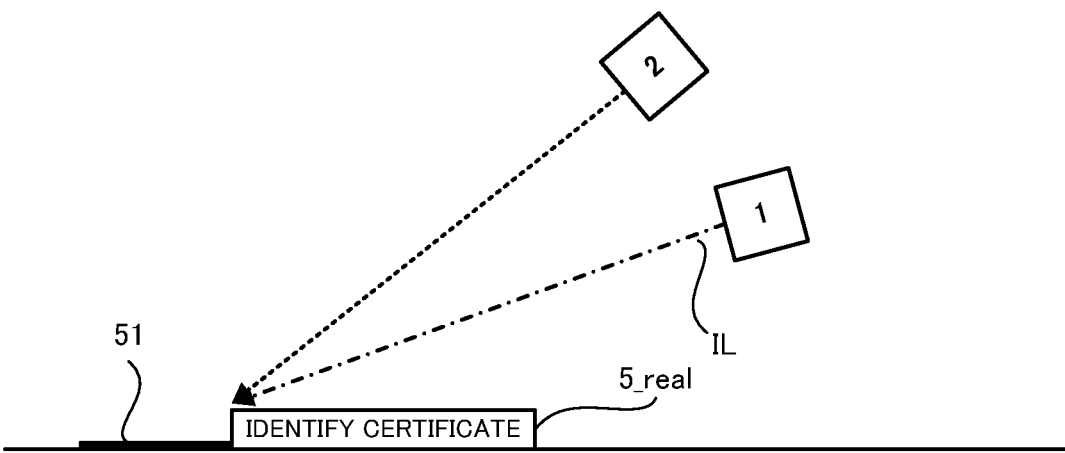
FIG. 7 is a side view illustrating a real identity certificate illuminated by the light source.

Thereafter, based on the shadow information, the determination unit 312 determines whether or not the identity certificate 5 appearing in the certificate image 21 is authentic (step S13). Specifically, as described above, the probability is relatively high that the thickness of an identity certificate 5_fake is thinner (particularly, much thinner) than the thickness of an identity certificate 5_real. Accordingly, as illustrated in FIG. 6 that is a side view illustrating the identity certificate 5_fake illuminated by the light source 1, it is highly probable that a shadow 51 of the identity certificate 5_fake is hardly created when the light source 1 illuminates the identity certificate 5_fake with the illumination light IL. As a result, it is highly probable that the shadow 51 of the identity certificate 5_fake does not appear in the certificate image 21 in which the identity certificate 5_fake appears. In contrast, as illustrated in FIG. 7 that is a side view illustrating the identity certificate 5_real illuminated by the light source 1, it is highly probable that a shadow 51 of the identity certificate 5_fake is created when the light source 1 illuminates the identity certificate 5_real with the illumination light IL. The reason is that the identity certificate 5_real has a certain thickness. As a result, it is highly probable that the shadow 51 of the identity certificate 5_real appears in the certificate image 21 in which the identity certificate 5_real appears. Accordingly, based on the shadow information, the determination unit 312 may determine that the identity certificate 5 appearing in the certificate image 21 is fake when the shadow 51 does not appear in the certificate image 21. In other words, the determination unit 312 may determine that the identity certificate 5_fake appears in the certificate image 21. In contrast, based on the shadow information, the determination unit 312 may determine that the identity certificate 5 appearing in the certificate image 21 is authentic when the shadow 51 appears in the certificate image 21. In other words, the determination unit 312 may determine that the identity certificate 5_real appears in the certificate image 21.

(1-3) Technical Effects of Certificate Determination System SYSa

As described above, the certificate determination system SYSa (particularly, the determination server 3) according to the first example embodiment can determine whether or not an identity certificate 5 appearing in a certificate image 21 is authentic, based on presence or absence of a shadow 51 of the identity certificate 5 appearing in the certificate image 21. Accordingly, the certificate determination system SYSa (particularly, the determination server 3) can determine whether or not the identity certificate 5 appearing in the certificate image 21 is authentic, at relatively low costs, compared to a case where a human determines, by visually checking the certificate image 21, whether or not the identity certificate 5 appearing in the certificate image 21 is authentic.

(2) Certificate Determination System SYS According to Second Example Embodiment Next, a certificate determination system SYS according to a second example embodiment is described. In the following description, the certificate determination system SYS according to the second example embodiment is referred to as "certificate determination system SYSb".

(2-1) Configuration of Certificate Determination System SYSb According to Second Example Embodiment The certificate determination system SYSb according to the second example embodiment is different, compared to the certificate determination system SYSa according to the first example embodiment, in that the certificate determination system SYSb includes a determination server 3b in place of the determination server 3. Other characteristics of the certificate determination system SYSb may be the same as the other characteristics of the certificate determination system SYSa.

Figures 8, 9:
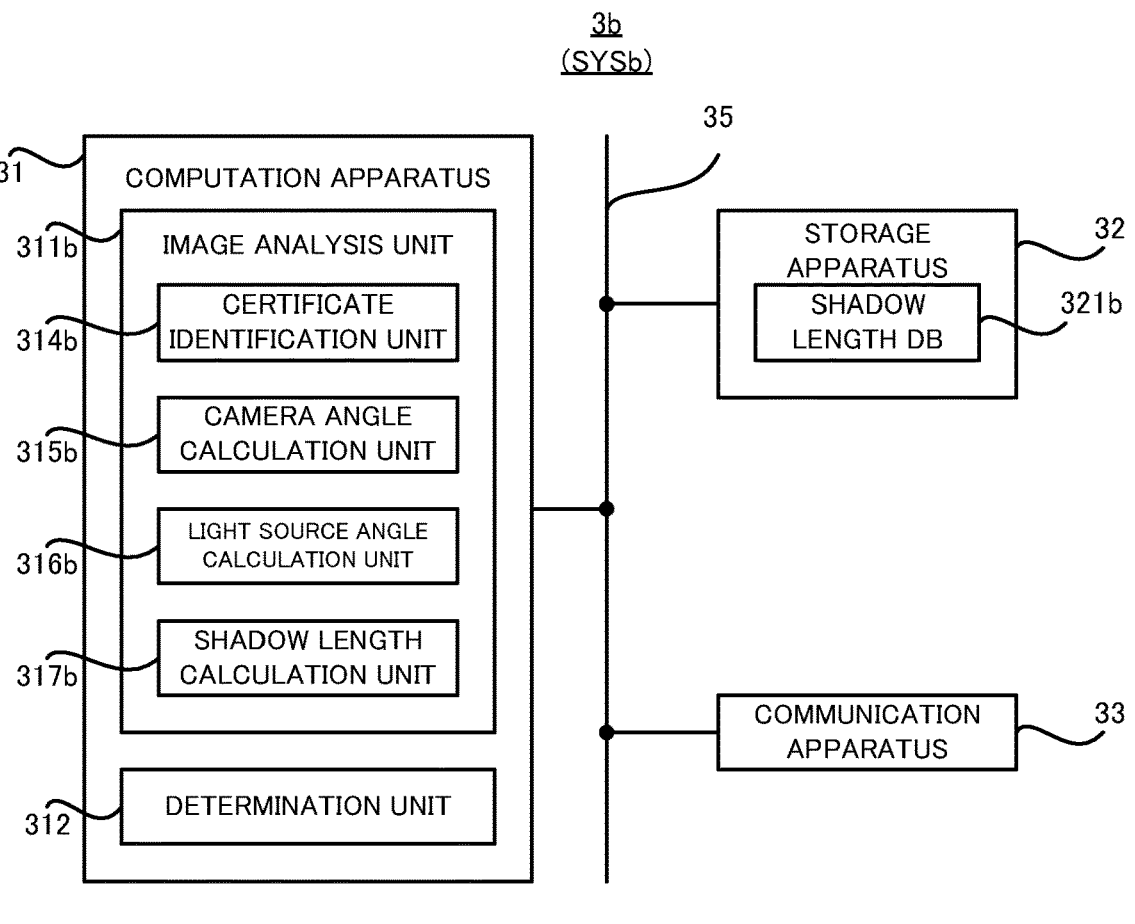
FIG. 8 is a block diagram illustrating a configuration of a determination server in a second example embodiment.
FIG. 9 is a side view illustrating a camera angle and a light source angle.

The determination server 3b, similarly to the determination server 3, generates shadow information related to a shadow 51 of an identity certificate 5 appearing in a certificate image 21, and performs certificate determination operation for determining, based on the generated shadow information, whether or not the identity certificate 5 appearing in the certificate image 21 is authentic. However, the determination server 3b generates the shadow information including information related a length L of the shadow 51 of the identity certificate 5. In such a respect, the determination server 3b is different from the determination server 3 that generates shadow information including information related to presence or absence of the shadow 51 of the identity certificate 5. Other characteristics of the determination server 3b may be the same as the other characteristics of the determination server 3. Accordingly, in the following, a description is given of the determination server 3b in the second example embodiment, focused mainly on differences between the determination server 3b and the determination server 3, with reference to FIG. 8. FIG. 8 is a block diagram illustrating a configuration of the determination server 3b in the second example embodiment.

As illustrated in FIG. 8, the determination server 3b is different, compared to the determination server 3, in that an image analysis unit 311b, in place of the image analysis unit 311, is implemented in the computation apparatus 31. Further, the determination server 3b is different, compared to the determination server 3, in that the storage apparatus 32 stores a shadow length DB 321b, which is one specific example of "estimated length data". Other components of the determination server 3b may be the same as the other components of the determination server 3.

The image analysis unit 311b is different, compared to the image analysis unit 311, in that the image analysis unit 311b includes a certificate identification unit 314b, a camera angle calculation unit 315b, which is one specific example of "calculation unit", a light source angle calculation unit 316b, which is one specific example of "calculation unit", and a shadow length calculation unit 317b, which is one specific example of "generation unit", in place of the shadow detection unit 313. Note that although operations of the certificate identification unit 314b, the camera angle calculation unit 315b, the light source angle calculation unit 316b, and the shadow length calculation unit 317b will be described in detail later with reference to FIG. 10 and others, an outline of the operations is described below. The certificate identification unit 314b identifies, based on a certificate image 21, a type of an identity certificate 5 appearing in the certificate image 21. The camera angle calculation unit 315b calculates, based on the certificate image 21, an angle of the camera 2 (hereinafter, referred to as "camera angle θc") to the identity certificate 5. The light source angle calculation unit 316b calculates, based on the certificate image 21, an angle of the light source 1 (hereinafter, referred to as "light source angle θo") to the identity certificate 5. The shadow length calculation unit 317b calculates, based on the certificate image 21, a length L of a shadow 51 of the identity certificate 5 appearing in the certificate image 21. The determination unit 312 determines, based on the camera angle θc calculated by the camera angle calculation unit 315b, the light source angle θo calculated by the light source angle calculation unit 316b, and the length L of the shadow 51 calculated by the shadow length calculation unit 317b, whether or not the identity certificate 5 appearing in the certificate image 21 is authentic.

The camera angle θc is a parameter (in other words, an indicator) indicating a relative positional relationship between the camera 2 and the identity certificate 5. An example of the camera angle θc is illustrated in FIG. 9. For example, as illustrated in FIG. 9, the camera angle θc may indicate an angle that a camera axis AC extending from the camera 2 forms with a surface of the identity certificate 5. For example, the camera angle θc may indicate at least one of an angle that the camera axis AC forms with an axis along the surface of the identity certificate 5 (for example, an axis along any one of a short side and a long side of the identity certificate 5) in a vertical direction (see FIG. 9), and an angle that the camera axis AC forms with the axis along the surface of the identity certificate 5 in a horizontal direction (not illustrated in FIG. 9). The camera axis AC may be an axis extending from the camera 2 toward a predetermined position on the identity certificate 5 (in the example illustrated in FIG. 9, an upper end of the identity certificate 5). The camera axis AC may be an axis along an optical axis of an optical system (for example, a lens) included in the camera 2.

The light source angle θo is a parameter (in other words, an indicator) indicating a relative positional relationship between the light source 1 and the identity certificate 5. An example of the light source angle θo is illustrated in FIG. 9. For example, as illustrated in FIG. 9, the light source angle θo may indicate an angle that a light source axis OC extending from the light source 1 forms with the surface of the identity certificate 5. For example, the light source angle θo may indicate at least one of an angle that the light source axis OC forms with an axis along the surface of the identity certificate 5 (for example, an axis along any one of the short side and the long side of the identity certificate 5) in the vertical direction (see FIG. 9), and an angle that the light source axis OC forms with the axis along the surface of the identity certificate 5 in the horizontal direction (not illustrated in FIG. 9). The light source axis OC may be an axis extending from the light source 1 toward a predetermined position on the identity certificate 5 (in the example illustrated in FIG. 9, the upper end of the identity certificate 5). The light source axis OC may be an axis along an optical axis of an optical system (for example, a lens) included in the light source 1. The light source axis OC may be an axis along a direction in which the illumination light IL emitted from the light source 1 travels.

The shadow length DB 321*b* is a database that is referred to by the determination unit 312 in order to determine whether or not the identity certificate 5 appearing in the certificate image 21 is authentic. Specifically, the shadow length DB 321*b* is used to estimate a length L of a shadow 51 of the identity certificate 5 presumed to appear in the certificate image 21, based on the camera angle θc calculated by the camera angle calculation unit 315*b* and the light source angle θo calculated by the light source angle calculation unit 316*b*. Accordingly, the shadow length DB 321*b* is a database indicating a relationship between the camera angle θc and the light source angle θo, and the length L of the shadow 51. An example of a data structure of the shadow length DB 321*b* is illustrated in FIG. 10. As illustrated in FIG. 10, the shadow length DB 321*b* includes a plurality of data records 322*b*. In each data record 322*b*, the length L of the shadow 51 of the identity certificate 5_real is associated with the camera angle θc and the light source angle θo. The shadow 51 here is a shadow presumed to appear in a certificate image 21 when it is assumed that the camera 2 captures an image of the real identity certificate 5_real illuminated by the light source 1 in a situation where the camera angle θc is a predetermined first angle and the light source angle θo is a predetermined second angle. In other words, in each data record 322*b*, associated with the camera angle θc and the light source angle θo is the logical length L (in other words, the length L in design) of the shadow 51 of the identity certificate 5_real presumed to appear in the certificate image 21 when it is assumed that the camera 2 disposed in such a manner that the camera angle θc is the predetermined second angle captures an image of the identity certificate 5_real illuminated by the light source 1 disposed in such a manner that the light source angle θo is the predetermined second angle. In the example illustrated in FIG. 10, the shadow length DB 321*b* includes, for example, (i) a data record 322*b* indicating that when it is assumed that the camera 2 disposed in such a manner that the camera angle θc is an angle a1 captures an image of the identity certificate 5_real illuminated by the light source 1 disposed in such a manner that the light source angle θo is an angle a2, the length L of the shadow 51 of the identity certificate 5_real presumed to then appear in the certificate image 21 is a4, and (ii) a data record 322*b* indicating that when it is assumed that the camera 2 disposed in such a manner that the camera angle θc is an angle b1 captures an image of the identity certificate 5_real illuminated by the light source 1 disposed in such a manner that the light source angle θo is an angle b2, the length L of the shadow 51 of the identity certificate 5_real presumed to then appear in the certificate image 21 is b4.

The length L of the shadow 51 of the identity certificate 5_real may change also depending on a distance (that is, an interval) D between the light source 1 and the camera 2, in addition to the light source angle θo and the camera angle θc. Accordingly, in each data record 322*b*, the length L of the shadow 51 of the identity certificate 5_real may be associated with the camera angle θc, the light source angle θo, and the distance D between the light source 1 and the camera 2. The shadow 51 here is a shadow presumed to appear in a certificate image 21 when it is assumed that the camera 2 captures an image of the real identity certificate 5_real illuminated by the light source 1 in a situation where the camera angle θc is the predetermined first angle, the light source angle θo is the predetermined second angle, and the distance D between the light source 1 and the camera 2 is a predetermined distance. Note that the "distance" in the second example embodiment may include at least one of a distance along an X axis, a distance along a Y axis, and a distance along a Z axis in an XYZ coordinate system with the X, Y, and Z axes being mutually orthogonal. In the example illustrated in FIG. 10, the shadow length DB 321*b* includes, for example, (i) the data record 322*b* indicating that when it is assumed that the camera 2 disposed in such a manner that the camera angle θc is the angle a1 and the camera 2 is a distance a3 away from the light source 1 captures an image of the identity certificate 5_real illuminated by the light source 1 disposed in such a manner that the light source angle θo is the angle a2, the length L of the shadow 51 of the identity certificate 5_real presumed to then appear in the certificate image 21 is a4, and (ii) the data record 322*b* indicating that when it is assumed that the camera 2 disposed in such a manner that the camera angle θc is the angle b1 and the camera 2 is a distance b3 away from the light source 1 captures an image of the identity certificate 5_real illuminated by the light source 1 disposed in such a manner that the light source angle θo is the angle b2, the length L of the shadow 51 of the identity certificate 5_real presumed to then appear in the certificate image 21 is b4.

The length L of the shadow 51 of the identity certificate 5_real may change also depending on the thickness of the identity certificate 5_real, in addition to the light source angle θo and the camera angle θc. The thickness of the identity certificate 5_real depends on a type of the identity certificate 5_real. For example, the thickness of a driver's license, which is an example of the identity certificate 5_real, differs from the thickness of a passport, which is an example of the identity certificate 5_real. Accordingly, the shadow length DB 321*b* may include a data record 322*b*, for each type of identity certificate 5_real. In other words, the shadow length DB 321*b* may include a data record 322*b* indicating the length of the shadow 51 of the identity certificate 5_real of a first type, and a data record 322*b* indicating the length of the shadow 51 of the identity certificate 5_real of a second type that is different from the first type. In the example illustrated in FIG. 10, the shadow length DB 321*b* includes data records 322*b* each indicating the length L of the shadow 51 of a driver's license, which is an example of the identity certificate 5_real, and data records 322b each indicating the length L of the shadow 51 of a passport, which is an example of the identity certificate 5_real.

Based on such a shadow length DB 321b, and on the camera angle θc calculated by the camera angle calculation unit 315b and the light source angle θo calculated by the light source angle calculation unit 316b, the determination unit 312 estimates a length L of a shadow 51 of the identity certificate 5 (that is, an estimated value of the length L of the shadow 51) presumed to appear in the certificate image 21. In other words, the determination unit 312 estimates the length L of the shadow 51 (that is, an estimated value of the length L of the shadow 51) appearing in the certificate image 21 when it is assumed that the real identity certificate 5_real appears in the certificate image 21. Thereafter, based on the length L of the shadow 51 estimated by the determination unit 312 (that is, the estimated value of the length L of the shadow 51), and the length L of the shadow 51 calculated by the shadow length calculation unit 317b (that is, a calculated value of the length L of the shadow 51), the determination unit 312 determines whether or not the identity certificate 5 appearing in the certificate image 21 is authentic.

Figure 11:
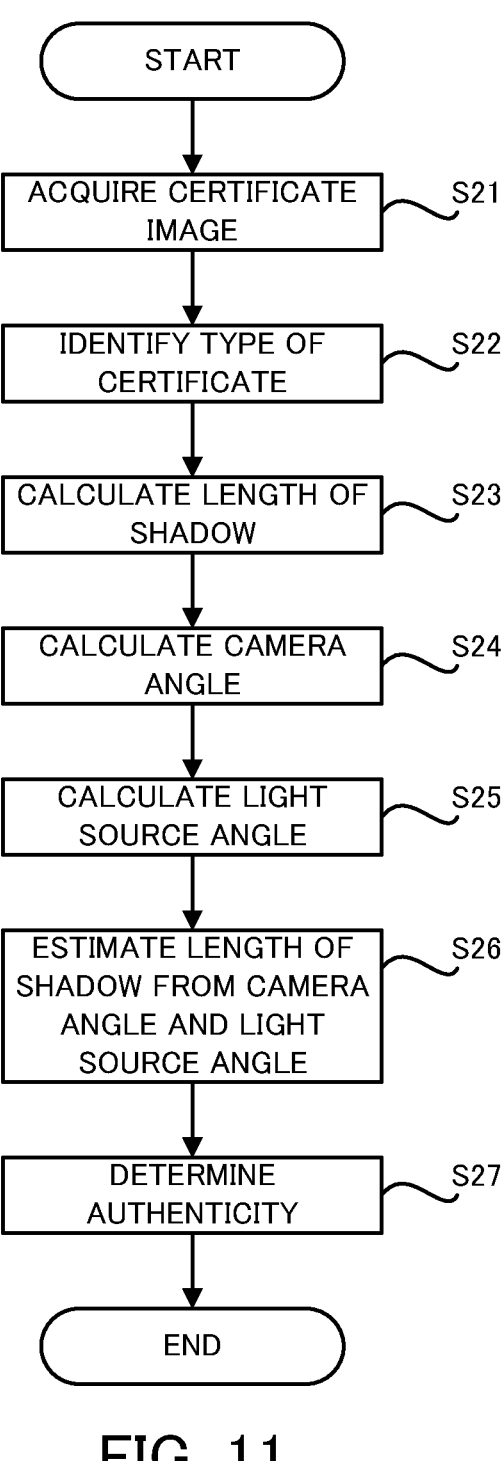
FIG. 11 is a flowchart illustrating a flow of certificate determination operation performed by the determination server in the second example embodiment.

(2-2) Certificate Determination Operation Performed by Determination Server 3b Next, the certificate determination operation performed by the determination server 3 in the second example embodiment is described with reference to FIG. 11. FIG. 11 is a flowchart illustrating a flow of the certificate determination operation performed by the determination server 3 in the second example embodiment.

As illustrated in FIG. 11, the image analysis unit 311, by using the communication apparatus 33, acquires a certificate image 21 transmitted from the camera 2 through the communication network 4 (step S21).

Thereafter, based on the certificate image 21 acquired in step S11, the certificate identification unit 314b in the image analysis unit 311 identifies a type of an identity certificate 5 appearing in the certificate image 21 (step S22). In other words, the certificate identification unit 314b, by analyzing the certificate image 21, identifies the type of the identity certificate 5 appearing in the certificate image 21 (step S22). For example, the certificate identification unit 314b may identify the type of the identity certificate 5, based on a characteristic (for example, at least one of size, color, and shape) of the identity certificate 5 appearing in the certificate image 21. For example, the certificate identification unit 314b may identify the type of the identity certificate 5 by performing, on the certificate image 21, a pattern matching process using a template in conformity with a format of the identity certificate 5. At the time, the certificate identification unit 314b, similarly to the shadow detection unit 313 in the first example embodiment, may identify an image region (that is, a certificate region 22) where the identity certificate 5 appears in the certificate image 21. Note that when the type of the identity certificate 5 appearing in the certificate image 21 is already known to the determination server 3, the image analysis unit 311 does not need to identify the type of the identity certificate 5. In such a case, the image analysis unit 311 does not need to include the certificate identification unit 314b.

Thereafter, based on the certificate image 21 acquired in step S11, the shadow length calculation unit 317b calculates a length L of a shadow 51 of the identity certificate 5 appearing in the certificate image 21 (step S23). Specifically, the size of the identity certificate 5 is a unique value depending on the type of the identity certificate 5. Accordingly, the size of the identity certificate 5 can be used for a reference length when the length L of the shadow 51 is calculated. Accordingly, first, the shadow length calculation unit 317b identifies a size (for example, a length of at least one of a long side and a short side) of the identity certificate 5, based on the type of the identity certificate 5 identified by the certificate identification unit 314b. The size of the identity certificate 5 is equivalent to the size of the certificate region 22 in the certificate image 21. Further, the shadow length calculation unit 317b, similarly to the shadow detection unit 313 described in the first example embodiment, detects an image region (that is, a shadow region 23) where a shadow extending outward from the certificate region 22 appears. Thereafter, the shadow length calculation unit 317b calculates a size of the detected shadow region 23, based on the size of the certificate region 22. The size of the shadow region 23 may be, for example, a distance from one end portion of the shadow region 23 adjacent to the certificate region 22 to the other end portion of the shadow region 23 far from the certificate region 22, along a direction in which the illumination light IL travels. The calculated size of the shadow region 23 is used for the length L of the shadow 51. A result of the calculation of the length L of the shadow 51 by the shadow length calculation unit 317b in step S23 is outputted, as shadow information, from the shadow length calculation unit 317b to the determination unit 312. In other words, in the second example embodiment, the shadow information including information related to the length L of the shadow 51 in the certificate image 21 is outputted from the shadow length calculation unit 317b to the determination unit 312.

Figure 12:
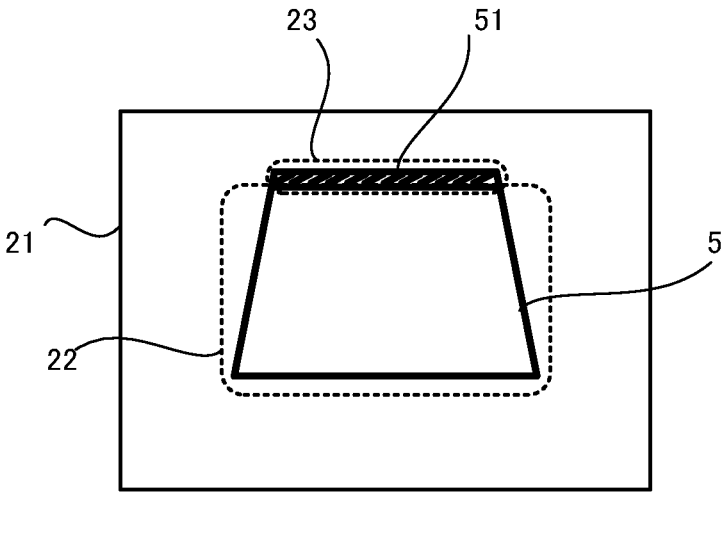
FIG. 12 is a plan view illustrating a certificate image generated in a situation where the camera angle is relatively large.
Figure 13:
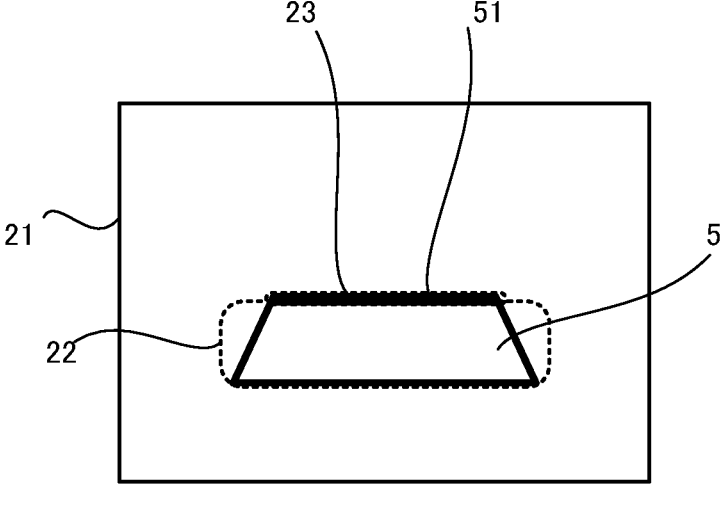
FIG. 13 is a plan view illustrating a certificate image generated in a situation where the camera angle is relatively small.

In parallel with, or immediately after, the operation in step S23, the camera angle calculation unit 315b, based on the certificate image 21 acquired in step S11, calculates an angle of the camera 2 (that is, a camera angle θc) to the identity certificate 5 (step S24). Specifically, when the camera angle θc is changed, a change occurs in the ratio between the lengths of two intersecting sides (for example, the long side and the short side) of the identity certificate 5 appearing in the certificate image 21. For example, FIG. 12 illustrates a certificate image 21 generated in a situation where the camera angle θc between the camera axis AC and the surface of the identity certificate 5 is relatively large, and FIG. 13 illustrates a certificate image 21 generated in a situation where the camera angle θc between the camera axis AC and the surface of the identity certificate 5 is relatively small. As illustrated in FIGS. 12 and 13, the smaller the camera angle θc is, the smaller the ratio of the short side (in the examples illustrated in FIGS. 12 and 13, a side extending in up-down directions) of the identity certificate 5 to the long side (in the examples illustrated in FIGS. 12 and 13, a side extending in right-left directions) of the identity certificate 5 is. Accordingly, the camera angle calculation unit 315b may calculate the camera angle θc, based on the ratio between the lengths of the two intersecting sides of the identity certificate 5. The camera angle θc calculated here corresponds to a camera angle θc at a time when the camera 2 captures the image of the identity certificate 5. The camera angle θc calculated in step S24 is outputted from the camera angle calculation unit 315b to the determination unit 312.

Thereafter, based on the camera angle θc identified in step S24, the light source angle calculation unit 316b calculates an angle of the light source 1 (that is, a light source angle θo) to the identity certificate 5 (step S25). Specifically, in a case where the positional relationship between the light source 1 and the camera 2 is fixed as described above, when the camera angle $\theta c$ is determined, the light source angle $\theta o$ is also uniquely determined. Alternatively, in a case where the positional relationship between the light source 1 and the camera 2 is information known to the determination server 3 even if the positional relationship between the light source 1 and the camera 2 is not fixed, when the camera angle $\theta c$ is determined, the light source angle $\theta o$ is also uniquely determined. Accordingly, the light source angle calculation unit 316b can calculate the light source angle $\theta o$, based on the camera angle $\theta c$ (further, based also on the positional relationship between the light source 1 and the camera 2 as necessary). The light source angle $\theta o$ calculated here corresponds to a light source angle $\theta o$ at the time when the camera 2 captures the image of the identity certificate 5. The light source angle $\theta o$ calculated in step S25 is outputted from the light source angle calculation unit 316b to the determination unit 312.

Thereafter, based on the camera angle $\theta c$ calculated in step S24, the light source angle $\theta o$ calculated in step S25, and the shadow length DB 321b, the determination unit 312 estimates a length L of a shadow 51 of the identity certificate 5 presumed to appear in the certificate image 21 (step S26). In other words, the determination unit 312 estimates the length L of the shadow 51 (that is, an estimated value of the length L of the shadow 51) appearing in the certificate image 21 when it is assumed that the real identity certificate 5_real appears in the certificate image 21. Specifically, the determination unit 312 estimates the logical length L (in other words, the length L in design) of the shadow 51 of the identity certificate 5_real presumed to appear in the certificate image 21 when it is assumed that the camera 2 disposed at a position based on the camera angle $\theta c$ calculated in step S24 captures an image of the real identity certificate 5_real illuminated by the light source 1 disposed at a position based on the light source angle $\theta o$ calculated in step S25. To estimate the length L of the shadow 51, for example, the determination unit 312 extracts, from the shadow length DB 321b, a data record 322b corresponding to the camera angle $\theta c$ calculated in step S24 and the light source angle $\theta o$ calculated in step S25. Thereafter, the determination unit 312 uses a length L of the shadow 51 indicated in the extracted data record 322b for the estimated value of the length L of the shadow 51.

Note that when each data record 322b includes information related to the distance D between the light source 1 and the camera 2 as described above, the determination unit 312 may identify a distance D between the light source 1 and the camera 2, and may extract, from the shadow length DB 321b, a data record 322b corresponding to the identified distance D. The distance D between the light source 1 and the camera 2 is a fixed value when the positional relationship between the light source 1 and the camera 2 is fixed. When the positional relationship between the light source 1 and the camera 2 is not fixed, the distance D between the light source 1 and the camera 2 is a variable value. However, when the positional relationship between the light source 1 and the camera 2 is information known to the determination server 3 as described above, the determination server 3 can identify the distance D between the light source 1 and the camera 2.

Figure 14:
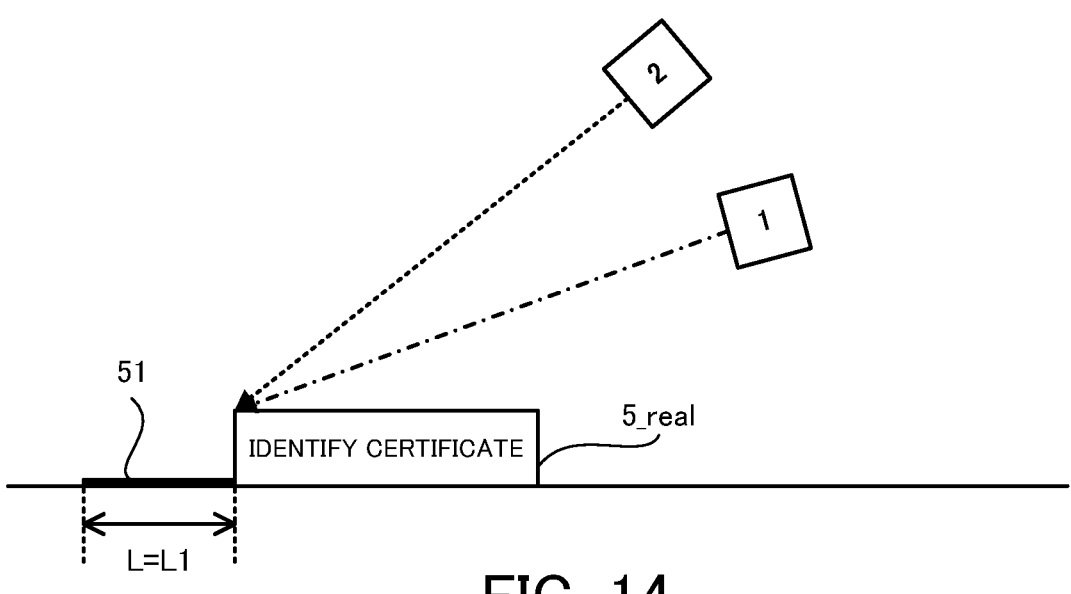
FIG. 14 is a side view illustrating the length of a shadow of a real identity certificate.
Figure 15:
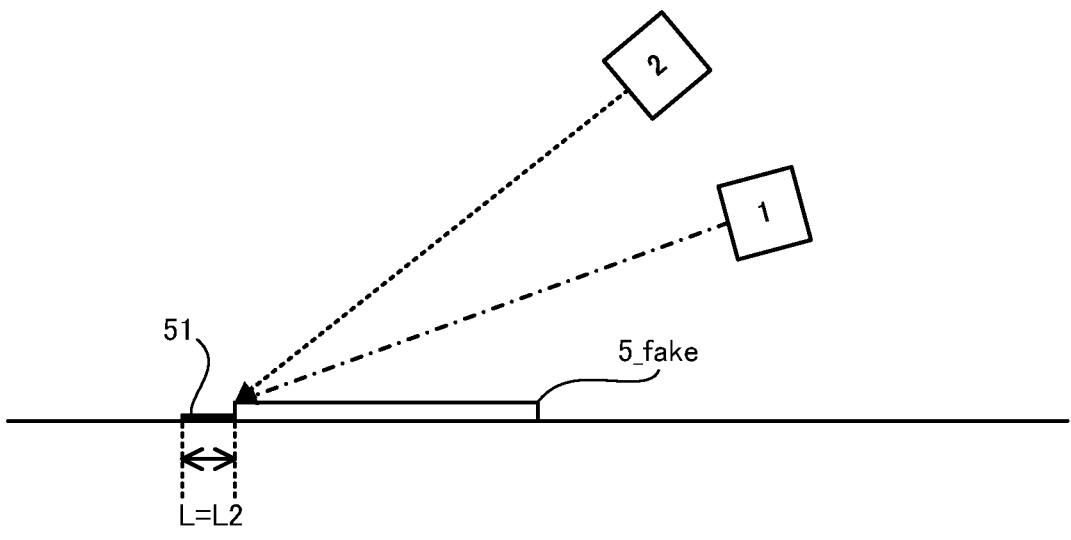
FIG. 15 is a side view illustrating the length of a shadow of a fake identity certificate.

Thereafter, based on the calculated value of the length L of the shadow 51 calculated in step S23, and the estimated value of the length L of the shadow 51 estimated in step S26, the determination unit 312 determines whether or not the identity certificate 5 appearing in the certificate image 21 is authentic (step S27). Specifically, as illustrated in FIG. 14, when the identity certificate 5 appearing in the certificate image 21 is authentic (that is, the identity certificate 5_real), the calculated value L1 of the length L of the shadow 51 is approximately the same value as the estimated value of the length L of the shadow 51 (that is, the logical length L). In contrast, as illustrated FIG. 15, when the identity certificate 5 appearing in the certificate image 21 is not authentic (that is, an identity certificate 5_fake), the calculated value L2 of the length L of the shadow 51 is a different value from the estimated value of the length L (that is, the logical length L) of the shadow 51. The reason is that when the identity certificate 5 appearing in the certificate image 21 is not authentic, the calculated value of the length L of the shadow 51 indicates the length L of the shadow 51 of the identity certificate 5_fake that has a different thickness from the thickness of the identity certificate 5_real. Accordingly, the calculated value L2 of the length L of the shadow 51 of the identity certificate 5_fake is a different value from the length L1 of the shadow 51 of the identity certificate 5_real (alternatively, the estimated value of the length L of the shadow 51 corresponding to the logical value of the length L1 of the shadow 51 of the identity certificate 5_real). Accordingly, the determination unit 312 can determine whether or not the identity certificate 5 appearing in the certificate image 21 is authentic, by comparing the calculated value of the length L of the shadow 51 calculated in step S23 and the estimated value of the length L of the shadow 51 estimated in step S26. For example, when a difference between the calculated value of the length L of the shadow 51 and the estimated value of the length L of the shadow 51 is more than a predetermined first allowance (that is, the calculated value of the length L of the shadow 51 is greatly different from the estimated value of the length L of the shadow 51), the determination unit 312 may determine that the identity certificate 5 appearing in the certificate image 21 is not authentic. For example, when the difference between the calculated value of the length L of the shadow 51 and the estimated value of the length L of the shadow 51 is less than a predetermined second allowance that is equal to or less than the first allowance (that is, the calculated value of the length L of the shadow 51 is not greatly different from, or approximately the same as, the estimated value of the length L of the shadow 51), the determination unit 312 may determine that the identity certificate 5 appearing in the certificate image 21 is authentic.

Note that the first and second allowances may be set to appropriate values that make it possible to distinguish, based on the length L of the shadow 51 of the identity certificate 5 appearing in the certificate image 21, between a state where the identity certificate 5 appearing in the certificate image 21 is authentic and a state where the identity certificate 5 appearing in the certificate image 21 is not authentic. Such first and second allowances may be set by experiment or simulation. The first allowance may be the same as, or may be different from, the second allowance.

(2-3) Technical Effects of Certificate Determination System SYSb

As described above, the certificate determination system SYSb (particularly, the determination server 3b) according to the second example embodiment can determine whether or not an identity certificate 5 appearing in a certificate image 21 is authentic, based on the length L of a shadow 51 of the identity certificate 5 appearing in the certificate image 21. Accordingly, the certificate determination system SYSb (particularly, the determination server 3b) can determine whether or not the identity certificate 5 appearing in the certificate image 21 is authentic, at relatively low costs, compared to a case where a human determines, by visually checking the certificate image 21, whether or not the identity certificate 5 appearing in the certificate image 21 is authentic.

Further in the second example embodiment, even if a shadow 51 of the identity certificate 5 appears in the certificate image 21, the determination server 3*b* determines that the identity certificate 5 appearing in the certificate image 21 is not authentic when the length L of the shadow 51 appearing in the certificate image 21 is different from the length L of a shadow 51 of the real identity certificate 5_real. Accordingly, the certificate determination system SYSb (particularly, the determination server 3*b*) can determine whether or not the identity certificate 5 appearing in the certificate image 21 is authentic, with higher accuracy.

(2-4) Modified Examples of Certificate Determination System SYSb According to Second Example Embodiment Next, modified examples of the certificate determination system SYSb according to the second example embodiment are described.

(2-4-1) First Modified Example

In a first modified example, the determination server 3*b* may generate shadow information including information related to a change (typically, time-series changes) in the length L of a shadow 51 of the identity certificate 5. Specifically, the determination server 3*b* acquires a plurality of certificate images 21 transmitted from the camera 2. The plurality of certificate images 21 are generated by repeating an operation, by the camera 2, of capturing an image of the identity certificate 5, and an operation of changing a positional relationship between the identity certificate 5 and at least one of the light source 1 and the camera 2. In other words, in the first modified example, each time the positional relationship between the identity certificate 5 and at least one of the light source 1 and the camera 2 is changed, the camera 2 captures an image of the identity certificate 5. Note that the plurality of certificate images 21 may be a plurality of images included in a video. Thereafter, the shadow length calculation unit 317*b* in the determination server 3*b* calculates a length L of a shadow 51 of the identity certificate 5 appearing in each of the plurality of certificate images 21. As a result, the shadow length calculation unit 317*b* can calculate time-series changes in the length L of the shadow 51. Results of the calculation of the length L of the shadow 51 by the shadow length calculation unit 317*b* are outputted, as shadow information, from the shadow length calculation unit 317*b* to the determination unit 312.

Moreover, the camera angle calculation unit 315*b* calculates a camera angle θc, based on each of the plurality of certificate images 21. As a result, the camera angle calculation unit 315*b* calculates time-series changes in the camera angle θc. Similarly, the light source angle calculation unit 316*b* calculates time-series changes in the light source angle θo, based on the time-series changes in the camera angle θc.

Thereafter, based on the time-series changes in the camera angle θc, the time-series changes in the light source angle θo, and the shadow length DB 321*b*, the determination unit 312 estimates time-series changes in the length L of a shadow 51 of the identity certificate 5 presumed to appear in the certificate images 21. In other words, the determination unit 312 estimates time-series changes in the length L of the shadow 51 (that is, estimated values of time-series changes in the length L of the shadow 51) appearing in the certificate images 21 when it is assumed that the real identity certificate 5_real appears in the certificate images 21.

Thereafter, the determination unit 312 determines whether or not the identity certificate 5 appearing in the certificate images 21 is authentic, by comparing the calculated values of the time-series changes in the length L of the shadow 51 calculated by the shadow length calculation unit 317*b* and the estimated values of the time-series changes in the length L of the shadow 51 estimated by the determination unit 312. In other words, in the first modified example, the determination unit 312 determines whether or not the identity certificate 5 appearing in the certificate images 21 is authentic, by comparing a pattern of changes in the length L of the shadow 51 actually appearing in the certificate images 21 (hereinafter, referred to as "actual change pattern") and a pattern of changes in the length L of the shadow 51 presumed to appear in the certificate images 21 (hereinafter, referred to as "presumed change pattern"). For example, when a degree of similarity between the actual change pattern of the length L of the shadow 51 and the presumed change pattern of the length L of the shadow 51 is higher than a first threshold value, the determination unit 312 may determine that the identity certificate 5 appearing in the certificate images 21 is authentic. For example, when the degree of similarity between the actual change pattern of the length L of the shadow 51 and the presumed change pattern of the length L of the shadow 51 is lower than a second threshold value that is equal to or less than the first threshold value, the determination unit 312 may determine that the identity certificate 5 appearing in the certificate images 21 is not authentic.

Note that the first and second threshold values may be set to appropriate values that make it possible to distinguish, based on a pattern of changes (that is, time-series changes) in the length L of the shadow 51 of the identity certificate 5 appearing in the certificate images 21, between a state where the identity certificate 5 appearing in the certificate images 21 is authentic and a state where the identity certificate 5 appearing in the certificate images 21 is not authentic. Such first and second threshold values may be set by experiment or simulation. The first threshold value may be the same as, or may be different from, the second threshold value.

Figure 16:
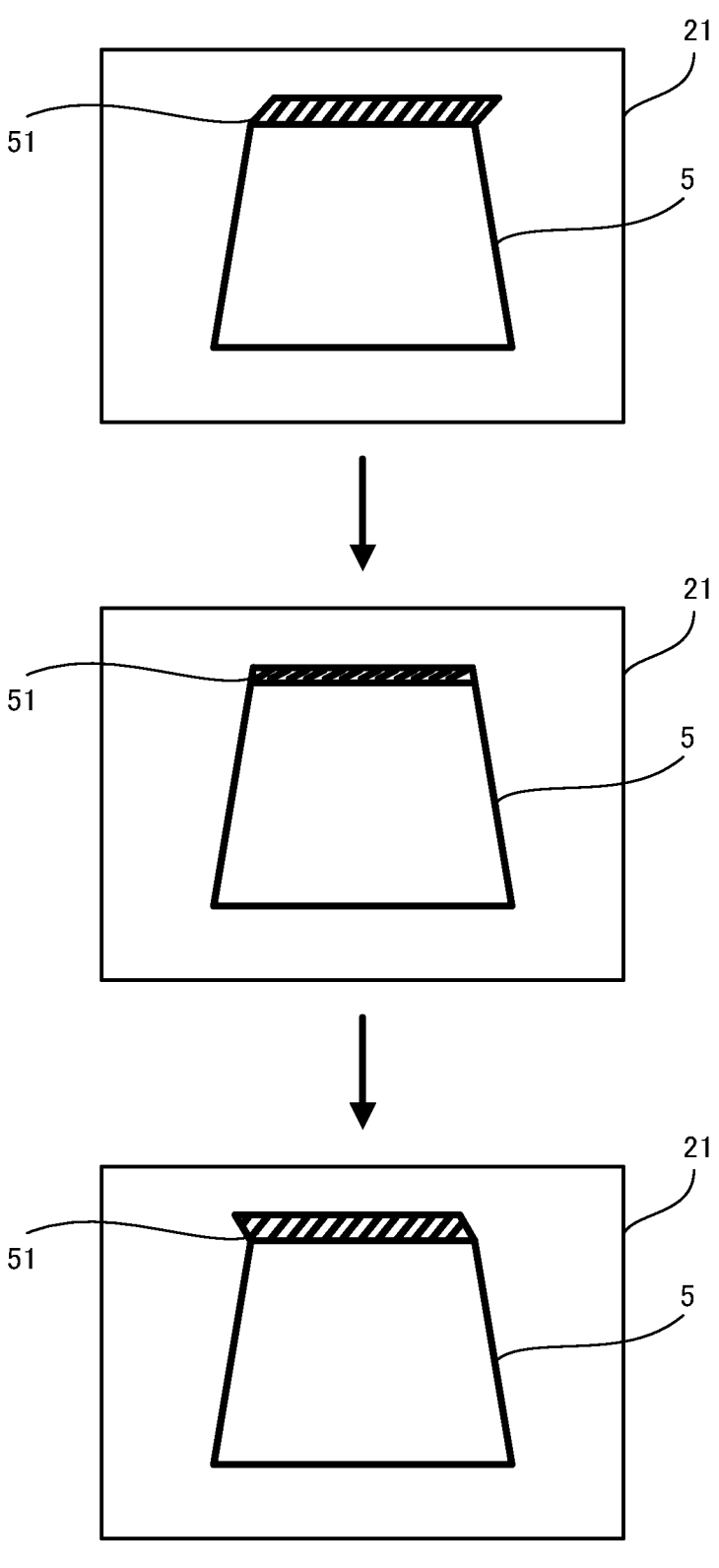
FIG. 16 is plan views illustrating aspects of a changing direction in which a shadow extends.
Figures 17, 18:
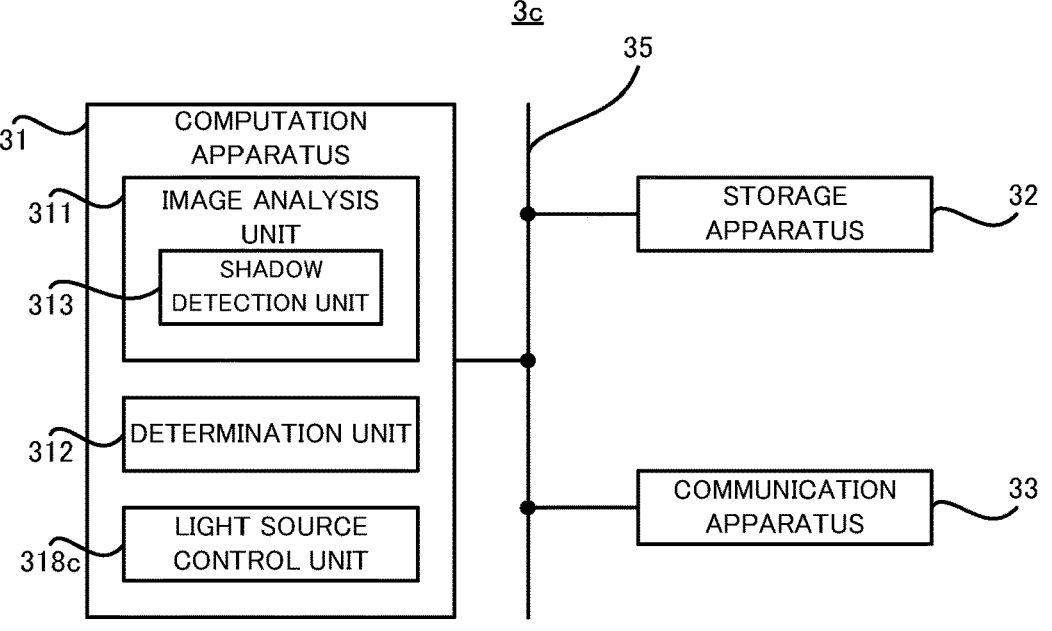
FIG. 17 is a data structure diagram illustrating an example of a data structure of a shadow length DB in a first modified example.
FIG. 18 is a block diagram illustrating a configuration of a determination server in a third example embodiment.

Note that in the above description, the determination server 3*b* performs the certificate determination operation by using time-series changes in the length L of the shadow 51. However, the determination server 3*b* may perform the certificate determination operation by using arbitrary time-series changes in the shadow 51. In other words, the determination server 3*b* may perform the certificate determination operation by using time-series changes in an arbitrary parameter indicating a state of the shadow 51. For example, when the positional relationship between the identity certificate 5 and at least one of the light source 1 and the camera 2 is changed, a change may occur in a direction in which the shadow 51 extends from the identity certificate 5 (that is, the direction of the shadow 51). For example, FIG. 16 illustrates aspects of the direction in which the shadow 51 extends, the direction sequentially changing to a first direction in which the shadow 51 extends from the identity certificate 5 to the upper right, then to a second direction in which the shadow 51 extends upward from the identity certificate 5, and then to a third direction in which the shadow 51 extends from the identity certificate 5 to the upper left. Accordingly, the determination server 3*b* may perform the certificate determination operation by using time-series changes in the direction in which the shadow 51 extends. For example, the shadow length calculation unit 317b in the determination server 3b may calculate a direction in which the shadow 51 of the identity certificate 5 appearing in each of the plurality of certificate images 21 extends. As a result, the shadow length calculation unit 317b can calculate time-series changes in the direction in which the shadow 51 extends. On the other hand, the determination unit 312 estimates time-series changes in the direction in which a shadow 51 of the identity certificate 5 presumed to appear in the certificate images 21 extends, based on the time-series changes in the camera angle θc, the time-series changes in the light source angle θo, and the shadow length DB 321b. However, in such a case, it is preferable that the direction in which the shadow 51 of the identity certificate 5_real presumed to appear in the certificate image 21 extends be associated with the camera angle θc and the light source angle θo in each data record 322b in the shadow length DB 321b, as illustrated in FIG. 17, which illustrates another example of the shadow length DB 321b. Thereafter, the determination unit 312 may determine whether or not the identity certificate 5 appearing in the certificate images 21 is authentic, by comparing calculated values of the time-series changes in the direction in which the shadow 51 extends, calculated by the shadow length calculation unit 317b, and estimated values of the time-series changes in the direction in which the shadow 51 extends, estimated by the determination unit 312. For example, when a degree of similarity between an actual change pattern of the direction in which the shadow 51 extends and a presumed change pattern of the direction in which the shadow 51 extends is higher than a third threshold value, the determination unit 312 may determine that the identity certificate appearing in the certificate images 21 is authentic. For example, when the degree of similarity between the actual change pattern of the direction in which the shadow 51 extends and the presumed change pattern of the direction in which the shadow 51 extends is lower than a fourth threshold value that is equal to or less than the third threshold value, the determination unit 312 may determine that the identity certificate 5 appearing in the certificate images 21 is not authentic. Note that the third and fourth threshold values may be set to appropriate values that make it possible to distinguish, based on a pattern of changes in the direction in which the shadow 51 of the identity certificate 5 appearing in the certificate images 21 extends, between a state where the identity certificate 5 appearing in the certificate images 21 is authentic and a state where the identity certificate 5 appearing in the certificate images 21 is not authentic. Such third and fourth threshold values may be set by experiment or simulation. The third threshold value may be the same as, or may be different from, the fourth threshold value.

(2-4-2) Second Modified Example

In the above description, in step S26 in FIG. 11, the determination unit 312 estimates the length L of the shadow 51 of the identity certificate 5, based on the camera angle θc, the light source angle θo, and the shadow length DB 321b. Thereafter, in step S27 in FIG. 11, the determination unit 312 determines whether or not the identity certificate 5 appearing in the certificate image 21 is authentic, by comparing a calculated value of the length L of the shadow 51 calculated by the shadow length calculation unit 317b in step S23 and an estimated value of the length L of the shadow 51 estimated by the determination unit 312 in step S26.

However, in step S26, the determination unit 312 may estimates, based on the length L of the shadow 51 calculated by the shadow length calculation unit 317b in step S23 and the shadow length DB 321b, a light source angle θo that the light source 1 is presumed to form with the identity certificate 5_real when it is assumed that the shadow 51 having the length L calculated by the shadow length calculation unit 317b appears in the certificate image 21. In other words, the determination unit 312 may estimate an estimated value of the light source angle θo.

Thereafter, in step S27, the determination unit 312 may determine whether or not the identity certificate 5 appearing in the certificate image 21 is authentic, based on the actual calculated value of the light source angle θo calculated in step S25, and the estimated value of the light source angle θo estimated in step S26.

Specifically, when the identity certificate 5 appearing in the certificate image 21 is authentic (that is, the identity certificate 5_real), the estimated value of the light source angle θo estimated in step S26 is approximately the same value as the actual calculated value of the light source angle θo. In contrast, when the identity certificate 5 appearing in the certificate image 21 is not authentic (that is, an identity certificate 5_fake), the estimated value of the light source angle θo estimated in step S26 is a different value from the actual calculated value of the light source angle θo. The reason is that since a state of the shadow 51 of the identity certificate 5_fake and a state of the shadow 51 of the identity certificate 5_fake are different, a light source angle θo back-calculated from the length L of the shadow 51 of the fake identity certificate 5_fake is naturally different from a light source angle θo back-calculated from the length L of the shadow 51 of the real identity certificate 5_real. Accordingly, the determination unit 312 can determine whether or not the identity certificate 5 appearing in the certificate image 21 is authentic, by comparing the calculated value of the light source angle θo calculated in step S24 and the estimated value of the light source angle θo estimated in step S26. In other words, the determination unit 312 can determine whether or not the identity certificate 5 appearing in the certificate image 21 is authentic, by determining whether or not the actual light source angle θo calculated in step S24 seems to be authentic, on the basis of an ideal light source angle θo (in other words, a light source angle θo in design) at which a shadow 51 having the length L calculated in step S23 is created. For example, when a difference between the calculated value of the light source angle θo and the estimated value of the light source angle θo is more than a predetermined third allowance (that is, the calculated value of the light source angle θo is greatly different from the estimated value of the light source angle θo), the determination unit 312 may determine that the identity certificate 5 appearing in the certificate image 21 is not authentic. For example, when the difference between the calculated value of the light source angle θo and the estimated value of the light source angle θo is less than a predetermined fourth allowance that is equal to or less than the third allowance (that is, the calculated value of the light source angle θo is not greatly different from, or approximately the same as, the estimated value of the light source angle θo), the determination unit 312 may determine that the identity certificate 5 appearing in the certificate image 21 is authentic.

Note that the third and the fourth allowances may be set to appropriate values that make it possible to distinguish, based on the light source angle θo, between a state where the identity certificate 5 appearing in the certificate image 21 is authentic and a state where the identity certificate 5 appearing in the certificate image 21 is not authentic. Such third and fourth allowances may be set by experiment or simulation. The third allowance may be the same as, or may be different from, the fourth allowance.

In the second modified example, the camera angle calculation unit 315*b* does not need to calculate a camera angle θc. In such a case, the image analysis unit 311 does not need to include the camera angle calculation unit 315*b*.

(2-4-3) Other Modified Examples

In the above description, the determination server 3*b* performs the certificate determination operation by using the camera angle θc. On the other hand, as described above, the camera angle θc is one specific example of a parameter indicating the relative positional relationship between the camera 2 and the identity certificate 5. Accordingly, the determination server 3*b* may perform the certificate determination operation by using an arbitrary parameter indicating the relative positional relationship between the camera 2 and the identity certificate 5, in addition to, or in place of, the camera angle θc. Examples of the arbitrary parameter indicating the relative positional relationship between the camera 2 and the identity certificate 5 include at least one of a distance from the identity certificate 5 to the camera 2, and an azimuth direction in which the camera 2 is positioned relative to the identity certificate 5.

Moreover, in the above description, the determination server 3*b* performs the certificate determination operation by using the light source angle θo. On the other hand, as described above, the light source angle θo is one specific example of a parameter indicating the relative positional relationship between the light source 1 and the identity certificate 5. Accordingly, the determination server 3*b* may perform the certificate determination operation by using an arbitrary parameter indicating the relative positional relationship between the light source 1 and the identity certificate 5, in addition to, or in place of, the light source angle θo. Examples of the arbitrary parameter indicating the relative positional relationship between the light source 1 and the identity certificate 5 include at least one of a distance from the identity certificate 5 to the light source 1, and an azimuth direction in which the light source 1 is positioned relative to the identity certificate 5.

(3) Certificate Determination System SYS According to Third Example Embodiment Next, a certificate determination system SYS according to a third example embodiment is described. In the following description, the certificate determination system SYS according to the third example embodiment is referred to as "certificate determination system SYSc". The certificate determination system SYSc according to the third example embodiment is different, compared to the certificate determination system SYSa according to the first example embodiment, in that the certificate determination system SYSc includes a determination server 3*c* in place of the determination server 3. Other characteristics of the certificate determination system SYSc may be the same as the other characteristics of the certificate determination system SYSa. Accordingly, in the following, a description is given of the determination server 3*c* in the third example embodiment, focused mainly on differences between the determination server 3*c* and the determination server 3, with reference to FIG. 18. FIG. 18 is a block diagram illustrating a configuration of the determination server 3*c* in the third example embodiment.

As illustrated in FIG. 18, the determination server 3*c* is different, compared to the determination server 3, in that a light source control unit 318*c*, which is one specific example of "control unit", is implemented as a logical processing block in the computation apparatus 31. Other components of the determination server 3*c* may be the same as the other components of the determination server 3.

The light source control unit 318*c* is capable of controlling the light source 1 through the communication network 4. In the third example embodiment, the light source control unit 318*c* may control a characteristic (for example, intensity) of the illumination light IL, by controlling the light source 1. For example, the light source control unit 318*c* may control the characteristic of the illumination light IL in such a manner that a shadow 51 appropriately appears in a certificate image 21, compared to the shadow 51 before the characteristic of the illumination light IL is controlled. Note that a state where "a shadow 51 appropriately appears in a certificate image 21" may refer to, for example, a state where a shadow 51 appears in a certificate image 21 to such an extent that the image analysis unit 311 can appropriately detect the shadow 51. Typically, the state where "a shadow 51 appropriately appears in a certificate image 21" may refer to a state where a shadow 51 clearly appears in a certificate image 21 to such an extent that a contrast between a shadow region 23 where the shadow 51 appears and an image region other than the shadow region 23 is equal to or more than a certain amount.

Such a certificate determination system SYSc according to the third example embodiment can appropriately detect the shadow 51 appearing in the certificate image 21, while achieving advantageous effects similar to the above-described advantageous effects that can be achieved by the certificate determination system SYSa according to the first example embodiment.

Note that the light source control unit 318*c* may control the camera 2 through the communication network 4, in addition to, or in place of, controlling the light source 1. The light source control unit 318*c* may control an optical characteristic (for example, sensitivity) of the camera 2, by controlling the camera 2. For example, the light source control unit 318*c* may control the optical characteristic of the camera 2 in such a manner that a shadow 51 appropriately appears in a certificate image 21, compared to the shadow 51 before the optical characteristic of the camera 2 is controlled. In such a case, the certificate determination system SYSc can also appropriately detect the shadow 51 appearing in the certificate image 21, while achieving advantageous effects similar to the above-described advantageous effects that can be achieved by the certificate determination system SYSa according to the first example embodiment.

(4) Supplementary Note

With respect to the example embodiments described above, the following Supplementary Notes will be further disclosed.

[Supplementary note 1] A certificate determination apparatus comprising:

a generation unit configured to generate, based on an image in which an identity certificate appears, shadow information related a shadow of the identity certificate appearing in the image; and a determination unit configured to determine, based on the shadow information, whether or not the identity certificate appearing in the image is authentic.

[Supplementary note 2] The certificate determination apparatus according to supplementary note 1, wherein
  the shadow information includes information related to presence or absence of the shadow, and
  the determination unit is configured to (i) determine that the identity certificate is not authentic when the shadow does not appear in the image, and (ii) determine that the identity certificate is authentic when the shadow appears in the image.

[Supplementary note 3] The certificate determination apparatus according to supplementary note 1 or 2, wherein
  the image is generated by an imaging apparatus capturing an image of the identity certificate illuminated with illumination light from a light source, and
  the shadow information includes information related to a length of the shadow,
  the certificate determination apparatus further comprising a calculation unit configured to calculate, based on the image, a positional relationship between the identity certificate and each of the light source and the imaging apparatus at a time when the image of the identity certificate is captured,
  wherein the determination unit is configured to
  (i) estimate, based on estimated length data, a length of the shadow presumed to appear in the image when it is assumed that the image of the identity certificate is captured in a situation where the positional relationship calculated by the calculation unit is established, the estimated length data indicating a length of the shadow presumed to appear in the image when it is assumed that the image of the identity certificate is captured in a situation where the positional relationship is a predetermined relationship, and
  (ii) determine whether or not the identity certificate is authentic, by comparing the estimated length of the shadow and the length of the shadow indicated by the shadow information.

[Supplementary note 4] The certificate determination apparatus according to supplementary note 3, wherein the determination unit is configured to (i) determine that the identity certificate is not authentic when a first difference is more than a first allowance, the first difference being a difference between the estimated length of the shadow and the length of the shadow indicated by the shadow information, and (ii) determine that the identity certificate is authentic when the first difference is less than a second allowance that is equal to or less than the first allowance.

[Supplementary note 5] The certificate determination apparatus according to any one of supplementary notes 1 to 4, wherein
  the image is generated by an imaging apparatus capturing an image of the identity certificate illuminated with illumination light from a light source, and
  the shadow information includes information related to a length of the shadow,
  the certificate determination apparatus further comprising a calculation unit configured to calculate, based on the image, a positional relationship between the identity certificate and the light source at a time when the image of the identity certificate is captured,
  wherein the determination unit is configured to
  (i) estimate, based on estimated length data, the positional relationship established when it is assumed that the shadow having the length indicated by the shadow information appears in the image, the estimated length data indicating a length of the shadow presumed to appear in the image when it is assumed that the image of the identity certificate is captured in a situation where the positional relationship is a predetermined relationship, and
  (ii) determine whether or not the identity certificate is authentic, by comparing the estimated positional relationship and the positional relationship calculated by the calculation unit.

[Supplementary note 6] The certificate determination apparatus according to supplementary note 5, wherein the determination unit is configured to (i) determine that the identity certificate is not authentic when a second difference is more than a third allowance, the second difference being a difference between the estimated positional relationship and the positional relationship calculated by the calculation unit, and (ii) determine that the identity certificate is authentic when the second difference is less than a fourth allowance that is equal to or less than the third allowance.

[Supplementary note 7] The certificate determination apparatus according to any one of supplementary notes 1 to 6, wherein
  the image is generated by an imaging apparatus capturing an image of the identity certificate illuminated with illumination light from a light source, and
  the generation unit is configured to generate, as the shadow information, information related to a change in the shadow appearing in the image, based on a plurality of the images generated by repetition of an operation, by the imaging apparatus, of capturing the image of the identity certificate, and an operation of changing a positional relationship between the identity certificate and at least one of the light source and the imaging apparatus.

[Supplementary note 8] The certificate determination apparatus according to supplementary note 7, further comprising a calculation unit configured to calculate, based on the image, a positional relationship between the identity certificate and each of the light source and the imaging apparatus at a time when the image of the identity certificate is captured,
  wherein the determination unit is configured to
  (i) estimate a change in the shadow between the plurality of images, based on estimated length data and the positional relationship calculated by the calculation unit, the estimated length data indicating a length of the shadow presumed to appear in the image when it is assumed that the image of the identity certificate is captured in a situation where the positional relationship is a predetermined relationship, and
  (ii) determine whether or not the identity certificate is authentic, by comparing the estimated change in the shadow and the change in the shadow indicated by the shadow information.

[Supplementary note 9] The certificate determination apparatus according to supplementary note 7 or 8, wherein aspects of the change in the shadow include at least one of a change in length of the shadow and a change in direction in which the shadow extends.

[Supplementary note 10] The certificate determination apparatus according to any one of supplementary notes 1 to 9, wherein the image is generated by an imaging apparatus capturing an image of the identity certificate illuminated with illumination light from a light source,
  the certificate determination apparatus further comprising a control unit configured to be able to control at least one of intensity of the light source and imaging sensitivity of the imaging apparatus.

[Supplementary note 11] A certificate determination method comprising:

a generation step of generating, based on an image in which an identity certificate appears, shadow information related a shadow of the identity certificate appearing in the image; and a determination step of determining, based on the shadow information, whether or not the identity certificate appearing in the image is authentic.

[Supplementary note 12] A recording medium storing a computer program that causes a computer to execute a certificate determination method, the certificate determination method comprising:

a generation step of generating, based on an image in which an identity certificate appears, shadow information related a shadow of the identity certificate appearing in the image; and a determination step of determining, based on the shadow information, whether or not the identity certificate appearing in the image is authentic.

Changes can be made to the present invention as appropriate within a scope where the gist or the idea of the invention that can be read from the claims and the specification in its entirety is not contradicted, and a certificate determination apparatus, a certificate determination method, and a recording medium involving such changes are also included in the technical idea of the present invention.

BRIEF DESCRIPTION OF REFERENCE NUMBERS

SYS Certificate determination system
1 Light source
2 Camera
21 Certificate image
3 Determination server
31 Computation apparatus
311 Image analysis unit
312 Determination unit
313 Shadow detection unit
314b Certificate identification unit
315b Camera angle calculation unit
316b Light source angle calculation unit
317b Shadow length calculation unit
318c Light source control unit
32 Storage apparatus
321b Shadow length DB
5 Identity certificate
51 Shadow

What is claimed is:

1. A certificate determination apparatus comprising:
a light source configured to illuminate an identity certificate with light;
a camera configured to capture an image of the identity certificate illuminated by the light from the light source;
a database configured to store data relating a positional relationship between the identity certificate and each of the light source and the camera to a length of a shadow presumed to appear in the image in a case where it is assumed that the image of the identity certificate is captured in a situation where the positional relationship is established;
at least one memory configured to store instructions; and
at least one processor configured to execute the instructions to:

detect a shadow of the identity certificate appearing in the image and generate, based on the image in which the identity certificate appears, shadow information related to the shadow of the identity certificate appearing in the image, the shadow information including information related to a length of the shadow;

determine, based on the shadow information, whether or not the identity certificate appearing in the image is authentic, wherein the at least one processor is further configured to execute the instructions to:

calculate, based on the image, a positional relationship between the identity certificate and each of the light source and the camera at a time when the image of the identity certificate is captured, extract, from the database, the length of the shadow presumed to appear in the image when it is assumed that the image of the identity certificate is captured in a situation where the positional relationship calculated is established determine whether or not the identity certificate is authentic, by comparing the length of the shadow extracted and the length of the shadow indicated by the shadow information, and a controller configured to control at least one of the light source and the camera based on whether the shadow of the identity certificate is detected, so that the shadow of the identity certificate appropriately appears in the image.

2. The certificate determination apparatus according to claim 1, wherein the shadow information includes information related to presence or absence of the shadow, and the at least one processor is configured to execute the instructions to (i) determine that the identity certificate is not authentic when the shadow does not appear in the image, and (ii) determine that the identity certificate is authentic when the shadow appears in the image.

3. The certificate determination apparatus according to claim 1, wherein the at least one processor is configured to execute the instructions to (i) determine that the identity certificate is not authentic when a first difference is more than a first allowance, the first difference being a difference between the estimated length of the shadow and the length of the shadow indicated by the shadow information, and (ii) determine that the identity certificate is authentic when the first difference is less than a second allowance that is equal to or less than the first allowance.

4. The certificate determination apparatus according to claim 1, wherein the at least one processor is further configured to execute the instructions to calculate, based on the image, a positional relationship between the identity certificate and the light source at a time when the image of the identity certificate is captured, wherein the at least one processor is configured to execute the instructions to (i) estimate, based on estimated length data, the positional relationship established when it is assumed that the shadow having the length indicated by the shadow information appears in the image, the estimated length data indicating a length of the shadow presumed to appear in the image when it is assumed that the image of the identity certificate is captured in a situation where the positional relationship is a predetermined relationship, and (ii) determine whether or not the identity certificate is authentic, by comparing the estimated positional relationship and the calculated positional relationship.

5. The certificate determination apparatus according to claim 4, wherein the at least one processor is configured to execute the instructions to (i) determine that the identity certificate is not authentic when a second difference is more than a third allowance, the second difference being a difference between the estimated positional relationship and the calculated positional relationship, and (ii) determine that the identity certificate is authentic when the second difference is less than a fourth allowance that is equal to or less than the third allowance.

6. The certificate determination apparatus according to claim 1, wherein the at least one processor is configured to execute the instructions to generate, as the shadow information, information related to a change in the shadow appearing in the image, based on a plurality of images generated by repetition of an operation, by the camera, of capturing the image of the identity certificate, and an operation of changing a positional relationship between the identity certificate and at least one of the light source and the camera.

7. The certificate determination apparatus according to claim 6, wherein the at least one processor is further configured to execute the instructions to calculate, based on the image, a positional relationship between the identity certificate and each of the light source and the camera at a time when the image of the identity certificate is captured, wherein the at least one processor is configured to execute the instructions to (i) estimate a change in the shadow between the plurality of images, based on estimated length data and the calculated positional relationship, the estimated length data indicating a length of the shadow presumed to appear in the image when it is assumed that the image of the identity certificate is captured in a situation where the positional relationship is a predetermined relationship, and (ii) determine whether or not the identity certificate is authentic, by comparing the estimated change in the shadow and the change in the shadow indicated by the shadow information.

8. The certificate determination apparatus according to claim 6, wherein aspects of the change in the shadow include at least one of a change in length of the shadow and a change in direction in which the shadow extends.

9. The certificate determination apparatus according to claim 1, wherein the at least one processor is further configured to execute the instructions to control at least one of intensity of the light source and imaging sensitivity of the camera.

10. The certificate determination apparatus according to claim 1, wherein the database includes data for each type of identity certificate, the at least one processor is further configured to execute the instructions to:

identify the type of identity certificate based on the image in which the identity certificate appears; and extract from the database, based on the type of identity certificate identified, the length of the shadow presumed to appear in the image when it is assumed that the image of the identity certificate is captured in the situation where the positional relationship calculated is established.

11. A certificate determination method comprising:

illuminating an identity certificate with light from a light source;

capturing, by a camera, an image of the identity certificate illuminated with the light from the light source;

storing in a database, data relating a positional relationship between the identity certificate and each of the light source and the camera to a length of a shadow presumed to appear in the image in a case where it is assumed that the image of the identity certificate is captured in a situation where the positional relationship is established;

detecting a shadow of the identity certificate appearing in the image and generating, by at least one processor, based on the image in which the identity certificate appears, shadow information related to the shadow of the identity certificate appearing in the image, the shadow information including information related to a length of the shadow; and determining, by the at least one processor, based on the shadow information, whether or not the identity certificate appearing in the image is authentic, wherein the determining by the at least one processor, based on the shadow information, whether or not the identity certificate appearing in the image is authentic comprises:

calculating, based on the image, a positional relationship between the identity certificate and each of the light source and the camera at a time when the image of the identity certificate is captured;

extracting from the database, the length of the shadow presumed to appear in the image when it is assumed that the image of the identity certificate is captured in a situation where the positional relationship calculated is established determining whether or not the identity certificate is authentic, by comparing the estimated length of the shadow extracted and the length of the shadow indicated by the shadow information; and controlling, by a controller, at least one of the light source and the camera based on whether the shadow of the identity certificate is detected, so that the shadow of the identity certificate appropriately appears in the image.

12. A non-transitory computer-readable recording medium storing a computer program that causes a computer to execute a certificate determination method, the certificate determination method comprising:

illuminating an identity certificate with light from a light source;

capturing, by a camera, an image of the identity certificate illuminated with the light from the light source;

storing in a database, data relating a positional relationship between the identity certificate and each of the light source and the camera to a length of a shadow presumed to appear in the image in a case where it is assumed that the image of the identity certificate is captured in a situation where the positional relationship is established;

generating, by at least one processor, based on the image in which the identity certificate appears, shadow information related to a shadow of the identity certificate appearing in the image, the shadow information including information related to a length of the shadow; and determining, by the at least one processor, based on the shadow information, whether or not the identity certificate appearing in the image is authentic, wherein the determining, by the at least one processor, based on the shadow information, whether or not the identity certificate appearing in the image is authentic comprises:

calculating, based on the image, a positional relationship between the identity certificate and each of the light source and the camera at a time when the image of the identity certificate is captured;

extracting from the database, the length of the shadow presumed to appear in the image when it is assumed that the image of the identity certificate is captured in a situation where the positional relationship calculated is established determining whether or not the identity certificate is authentic, by comparing the estimated length of the shadow extracted and the length of the shadow indicated by the shadow information; and controlling, by a controller, at least one of the light source and the camera based on whether the shadow of the identity certificate is detected, so that the shadow of the identity certificate appropriately appears in the image.

\* \* \* \* \*